(12) United States Patent
Dozier et al.

(10) Patent No.: US 9,472,369 B2
(45) Date of Patent: Oct. 18, 2016

(54) RETRACTABLE CONNECTOR FOR A SINGLE VERTICAL MAIN BUS STACK PANEL BOARD MOTOR STARTER

(71) Applicant: SCHNEIDER ELECTRIC USA, INC., Palatine, IL (US)

(72) Inventors: Steven Wayne Dozier, Murfreesboro, TN (US); John Patrick Taylor, Murfreesboro, TN (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 14/774,164

(22) PCT Filed: Mar. 15, 2013

(86) PCT No.: PCT/US2013/032392
§ 371 (c)(1),
(2) Date: Sep. 10, 2015

(87) PCT Pub. No.: WO2014/143020
PCT Pub. Date: Sep. 18, 2014

(65) Prior Publication Data
US 2016/0020053 A1 Jan. 21, 2016

(51) Int. Cl.
*H01R 4/60* (2006.01)
*H01H 71/10* (2006.01)
*H01H 71/08* (2006.01)
*H01R 25/14* (2006.01)
*H02P 1/26* (2006.01)
*H02B 1/056* (2006.01)
*H01R 25/16* (2006.01)
*H02P 1/16* (2006.01)
*H01H 89/06* (2006.01)
*H02G 5/08* (2006.01)

(52) U.S. Cl.
CPC ............ *H01H 71/10* (2013.01); *H01H 71/08* (2013.01); *H01R 25/142* (2013.01); *H01R 25/162* (2013.01); *H02B 1/056* (2013.01); *H02P 1/16* (2013.01); *H02P 1/26* (2013.01); *H01H 89/06* (2013.01); *H02G 5/08* (2013.01)

(58) Field of Classification Search
CPC .................................................... H01R 25/162
USPC ........................ 439/207, 213, 210, 212, 33
See application file for complete search history.

(56) References Cited

U.S. PATENT DOCUMENTS

| 4,508,400 | A | | 4/1985 | Herbert | |
|---|---|---|---|---|---|
| 5,760,339 | A | * | 6/1998 | Faulkner | H01R 25/162 174/88 B |
| 6,176,720 | B1 | * | 1/2001 | Johnson | H01R 25/162 174/88 B |

(Continued)

OTHER PUBLICATIONS

International Search Report and Written Opinion mailed May 31, 2013 in International Application Serial No. PCT/US13/032392.

*Primary Examiner* — Phuongchi T Nguyen
(74) *Attorney, Agent, or Firm* — Locke Lord LLP

(57) ABSTRACT

A retractable connector assembly for establishing an electrical connection to a power bus bar from an electrical device is disclosed. The retractable connector assembly includes a frame plate and a sled. The sled has a rack and a connector assembly having an electrical contact. The sled has an extended position and a retracted position relative to the frame plate. A spur gear is mounted on the frame plate. The spur gear engages the rack to move the sled between the retracted position and the extended position when the spur gear is rotated. The electrical contact creates an electrical connection with the power bus bar when the sled is in the extended position but not in the retracted position. Safety interlocks and indicia can be provided for the connector assembly.

20 Claims, 7 Drawing Sheets

(56) References Cited

U.S. PATENT DOCUMENTS

| | | |
|---|---|---|
| 6,194,983 B1 | 2/2001 | Bogdon et al. |
| 6,371,788 B1 * | 4/2002 | Bowling .............. H01R 13/518 439/358 |
| 8,864,510 B2 * | 10/2014 | Walgenbach .......... H02G 5/007 439/210 |
| 2005/0233625 A1 * | 10/2005 | Faulkner ................ H02G 5/007 439/210 |
| 2006/0131145 A1 | 6/2006 | Suh |

* cited by examiner

RETRACTABLE CONNECTOR FOR A SINGLE VERTICAL MAIN BUS STACK PANEL BOARD MOTOR STARTER

TECHNICAL FIELD

The present disclosure relates generally to a retractable electrical connector for an electrical device and more specifically to a retractable connector assembly for electrical connection of an electrical device to a main bus bar stack on a pan.

BACKGROUND

Motor control devices such as motor starters often are provided with modular mounting mechanisms that allow such devices to be mounted on a pan. A typical pan includes a power bus bar assembly and space around the power bus bar assembly to mount the control components for electrical connection to the power bus bar assembly. The power bus bar assembly has a number of high power connectors which may power multiple control components. One example of a power bus bar assembly is an I-Line stack manufactured by Schneider Electric, Inc. In this manner, one control pan may be used to operate and power multiple control components such as motor control devices or circuit breaker modules. Such pans with inserted components may be contained in a panel board cabinet for efficient storage and maintenance. After a control component such as a motor starter or a circuit breaker is mounted on the pan, an electrical connection is made to the power bar bus assembly to power the control component.

Given the ease of installing control components on the pan, users often plug such control components onto a power bus bar assembly such as the I-Line stack bus while the power bus bar assembly is still energized. Although such operating procedures are not condoned, it is still a common practice throughout the industry. In order to protect a user from potential shock when connecting the control components, many components have adjustable electrical connectors which are mechanically engaged with the power bar bus assembly only after the control component is mounted on the pan. Since the mounting operation does not connect the control component to the power bus bar assembly, the separate connection step to electrically connect the control component minimizes the potential for accidental contact with the power bar bus when installing the control components.

Known connection mechanisms use a lead screw operation to engage/disengage the electrical connectors thereby requiring numerous rotations of the lead screw. This requires a user to complete 8-12 full rotations of a cranking handle to engage or withdraw electrical connectors to or from the power bar bus assembly. The resulting process to connect a control component to the power bus is thus needlessly cumbersome. Further, the electrical connector mechanism requires many additional parts to accomplish the engagement of the connectors with the power bar bus assembly.

Thus, a need exists for an electrical connection assembly that minimizes the electrical hazards of connecting a control component to a fixed power bus bar assembly. There is a further need for a connector assembly to minimize the effort and mechanical parts necessary to electrically connect a control component with a power bus bar assembly. There is also a need for an indication of the location of the retractable electrical connector when the control component is electrically connected to the bus. There is also a need to prevent the electrical connection of a control component with a power bus bar assembly when the control component is switched on.

SUMMARY

One disclosed example is a retractable electrical connector assembly for a mountable electrical control device to be powered by a power bus bar. The retractable connector assembly has a sled with electrical connectors. The sled has a retracted position and an extended position where jaw type electrical connectors engage corresponding conductive bars of the power bus bar. The example assembly uses a spur gear that engages a rack on the sled to create linear movement of the sled between the retracted and extended position. The spur gear is connected to a shaft to allow a user to rotate the spur gear. This shaft and spur gear assembly reduces the crank operations to 90 degrees of rotation (a quarter turn) while still providing for a compact connector mechanism. This mechanism also enables positional indication of the location of the electrical connectors with a single part via an indication plate directly engaged as part of the shaft.

This retractable electrical connector assembly also has an advantage over most racking devices because neither the electrical control device (i.e., a circuit breaker or a motor starter) nor the enclosure chassis enclosing the electrical device needs to move. This method of construction greatly reduces the number of parts required to provide a retractable disconnecting mechanism for a mounted electrical device while providing a safe process to connect the electrical control device to the power bus bar assembly. Safety interlocks and indicia may be provided for the connector assembly to increase protection from inadvertent electrical connection of the switch unit to the power bus bar assembly when the electrical control device is switched on. The safety interlocks also prevent retraction of the connectors from the power bus bar assembly when the electrical control device is receiving power from power bus bar assembly.

Additional aspects will be apparent to those of ordinary skill in the art in view of the detailed description of various embodiments, which is made with reference to the drawings, a brief description of which is provided below.

BRIEF DESCRIPTION OF THE DRAWINGS

The foregoing and other advantages of the invention will become apparent upon reading the following detailed description and upon reference to the drawings.

Figure 1:
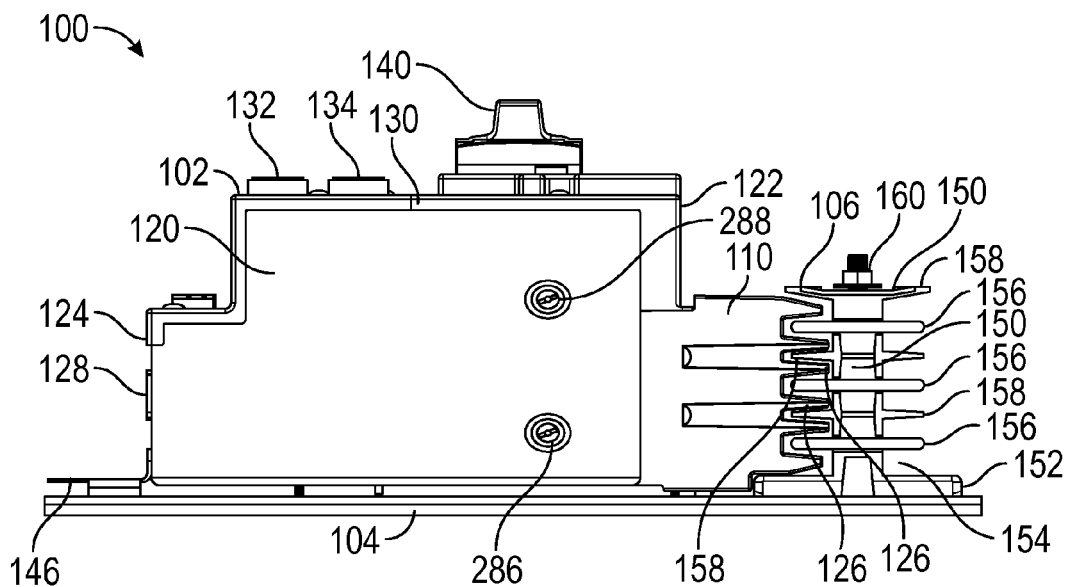
FIG. 1 is a side view of a mountable electrical control device, a pan and a power bus bar assembly.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

One disclosed example is a retractable connector assembly for establishing an electrical connection between a power bus bar and an electrical device. The retractable connector assembly includes a frame plate and a sled having a rack and an electrical connector assembly having an electrical contact. The sled has an extended position and a retracted position relative to the frame plate. A spur gear is coupled to the frame plate. The spur gear engages the rack to move the sled between the retracted position and the extended position when the spur gear is rotated. When the sled is in the extended position the electrical contact creates an electrical connection with the power bus bar. When the sled is in the retracted position, the electrical contact is electrically disconnected from the power bus bar.

Another example is an electrical device for mounting on a pan in fixed position relative to a power bus assembly. The electrical device includes a chassis for connection with the pan. The electrical device includes an electrical component having an electrical input and attached to the chassis. The electrical device includes a retractable connector assembly electrically coupled to the electrical input. The retractable connector assembly includes a frame plate fixed to the chassis and a sled having a rack and an electrical connector assembly having an electrical contact. The sled has an extended position and a retracted position relative to the frame plate. A spur gear is coupled to the frame plate. The spur gear engages the rack to move the sled between the retracted position and the extended position when the spur gear is rotated. When the sled is in the extended position the electrical contact creates an electrical connection with the power bus bar. When the sled is in the retracted position, the electrical contact is electrically disconnected from the power bus bar.

Another example is a panel board switching assembly including a pan and a bus bar assembly having a bar conductor and insulators mounted on the pan. An electrical switch unit is mounted in proximity to the bus bar assembly. The electrical switch unit includes a chassis for connection with the pan and an electrical component having an electrical input attached to the chassis. The electrical switch unit includes a retractable connector assembly electrically coupled to the electrical input. The retractable connector assembly includes a frame plate fixed to the chassis and a sled having a rack and an electrical connector assembly having an electrical contact. The sled has an extended position and a retracted position relative to the frame plate. A spur gear is coupled to the frame plate. The spur gear engages the rack to move the sled between the retracted position and the extended position when the spur gear is rotated. When the sled is in the extended position the electrical contact creates an electrical connection with the power bus bar. When the sled is in the retracted position, the electrical contact is electrically disconnected from the power bus bar.

FIG. 1 is a cross-sectional view showing a motor control system 100 that includes a mountable electrical device which is a control switch unit 102 in this example, a panel board (not shown) has an I-line pan 104 and a power bus bar assembly 106. The motor control system 100 includes electronic control components such as the switch unit 102 that provides power and controls to various other electronic components and receives power from the power bus bar assembly 106. In this example, the switch unit 102 may include a GV3 motor control starter manufactured by Schneider Electric or any similar electrical device. The switch unit 102 is mounted on the pan 104 along with other modular electrical components which may be powered by the power bus bar assembly 106. It is to be understood that the pan 104 has sockets which allow numerous components to be mounted in proximity to the power bus bar assembly 106 in order to be connected to the power bus assembly and draw power from the power bus bar assembly 106. The pan 104 and attached components such circuit breakers or motor starters may be part of a larger panel board which is held in a switchboard cabinet.

In this example, the switch unit 102 is a motor starter that has internal components and power outputs which may be connected to control a motor. The switch unit 102 is mounted in proximity to the power bus bar assembly 106. The mounting position of the switch unit 102 on the pan 104 provides separation between itself and the power bus bar assembly 106 to prevent accidental electrical current from flowing from the power bus bar assembly 106 to the switch unit 102. The switch unit 102 includes an electrical retractable connector assembly 110 for establishing an electrical connection between the power bus bar assembly 106 and an electrical device such as the switch unit 102 as will be explained below. It is to be understood that control components such as the switch unit 102 may be mounted on both sides of the power bus bar assembly 106, but only one switch unit 102 is shown in FIG. 1 for ease of explanation.

Figure 2:
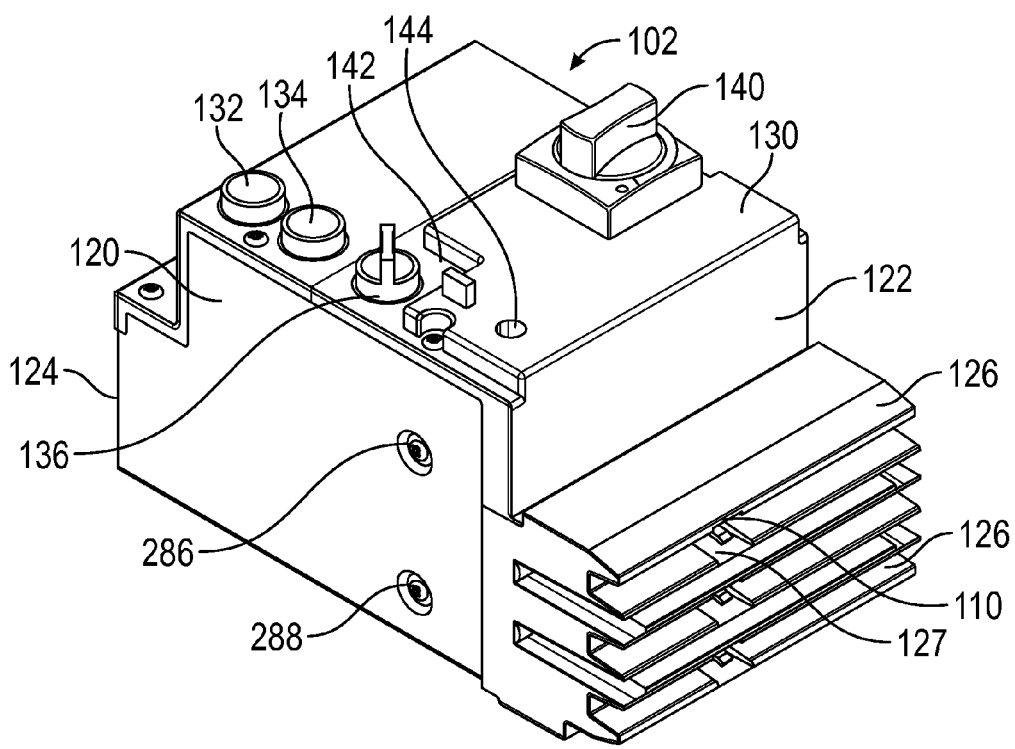
FIG. 2 is a perspective view of the example mountable electrical control device in FIG. 1.

FIG. 2 is a perspective view of the switch unit 102. The switch unit 102 in this example includes a casing 120 that serves as a chassis that encloses various components such as connectors, associated electronics, lugs, relays, etc. The casing 120 includes mechanical components for connecting the switch unit 102 with the pan 104. The casing 120 has a front panel 122 that holds the electrical retractable connector assembly 110 and an opposite back panel 124. The front panel 122 has a number of insulated vanes 126 that engage the power bus bar assembly 106 as will be explained below. The back panel 124 has a number of power sockets 128 for connection to an electrical device such as a motor which is controlled by the switch unit 102. The casing 120 includes a top panel 130 that includes an ON button 132 and an OFF button 134 for activating power to the power sockets 128 to provide power to a connected device such as a motor. A selector switch 136 changes the status of the direction of a motor (not shown) attached to the switch unit 102. Moving the selector switch 136 changes the direction of a connected motor from forward to reverse. In this example, the top panel 130 includes a rotational knob 140 that may be rotated to an on position to activate power to the switch unit 102 when the switch unit 102 is electrically connected to the power bus bar assembly 106. The rotational knob 140 also has an OFF position which disconnects power to the switch unit 102. The top panel 130 also includes a lock plate mechanism 142 and a socket 144 allowing a user to extend or retract electrical connectors of the electrical retractable connector assembly 110. As may be seen in FIG. 1, the switch unit 102 includes mounting brackets 146 and for retaining screws for attachment to the pan 104.

As shown in FIG. 1, the power bus bar assembly 106 has a center support 150 attached perpendicularly to a base 152 which is fixed to the pan 104. The base 152 is manufactured from an electrically insulated material. The center support 150 supports a vertical bus bar stack 154 that includes alternating plated bus conductor bars 156 and molded, glass reinforced, polyester, insulators 158. The bus bar stack 154 is attached together with hardened steel bolts 160 which extend through the center support 150 to secure the bus bars 156 and the insulators 158 in place. As shown in FIG. 1, when the switch unit 102 is mounted on the pan 104, the insulated vanes 126 interlace with the insulators 158 of the bus bar stack 154 to protect the electrical connections between the power bus bar assembly 106 and the switch unit 102.

Figure 3:
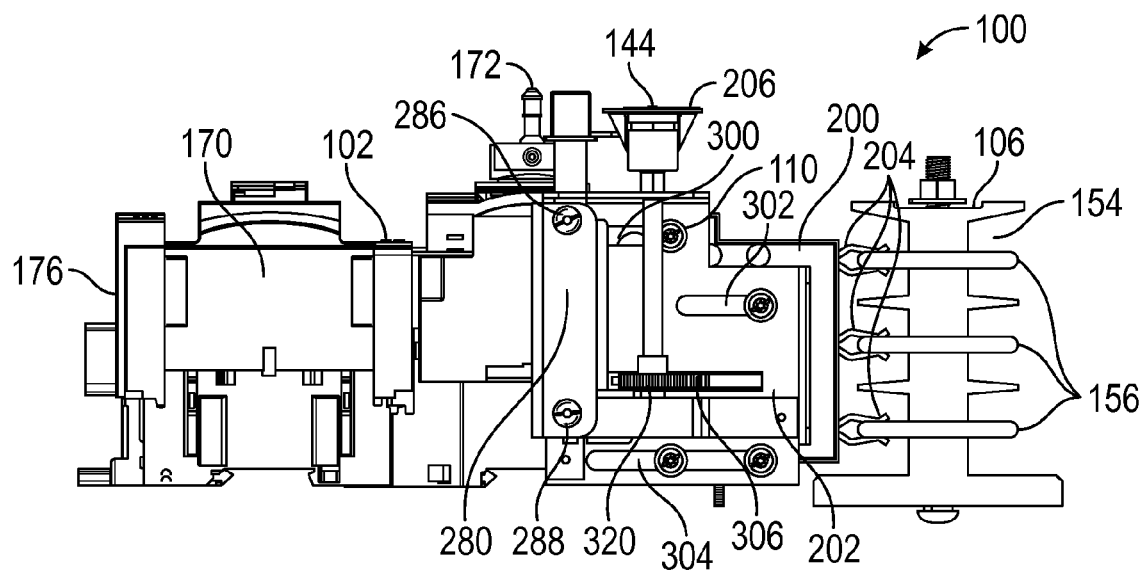
FIG. 3 is a side view of the example mountable electrical control device in FIG. 1 with electrical connectors extended to engage the power bus bar assembly in FIG. 1.
Figure 4A:
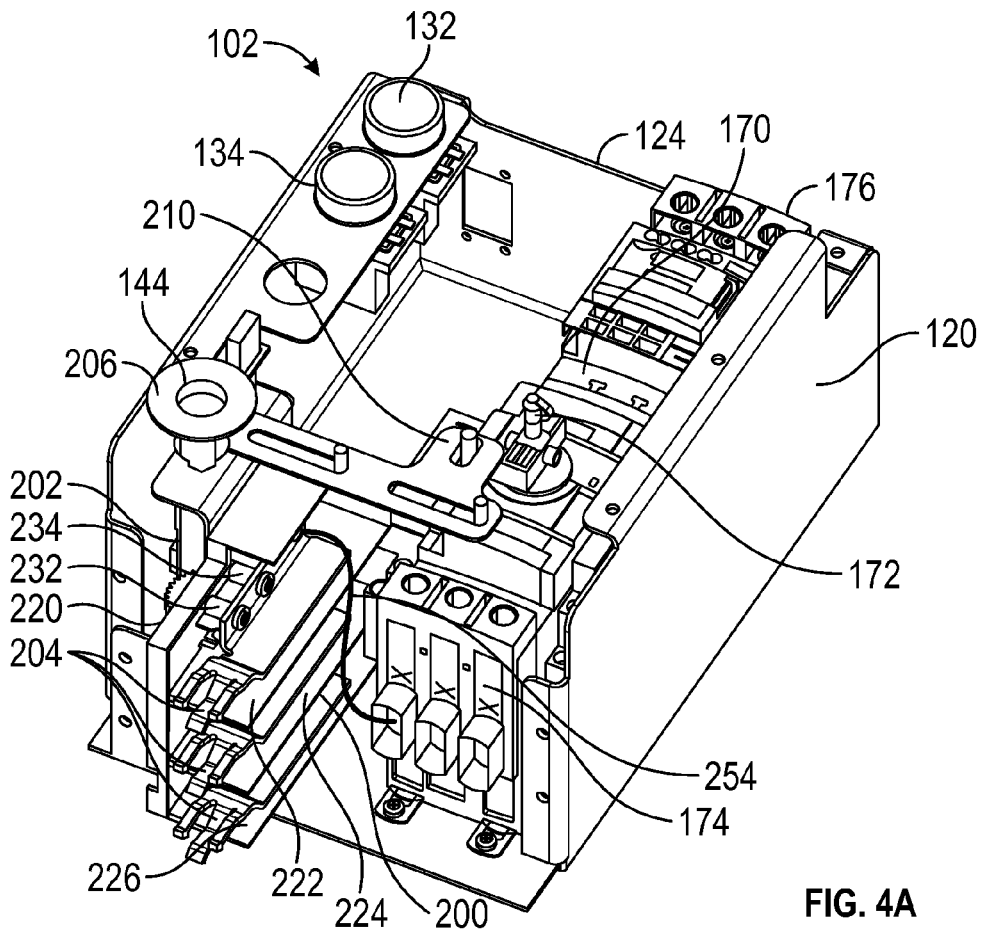
FIG. 4A is a partially exposed perspective view of the example mountable electrical control device in FIG. 1 showing the example retractable connector assembly having stab type connectors to engage the power bus bar assembly.
Figure 4B:
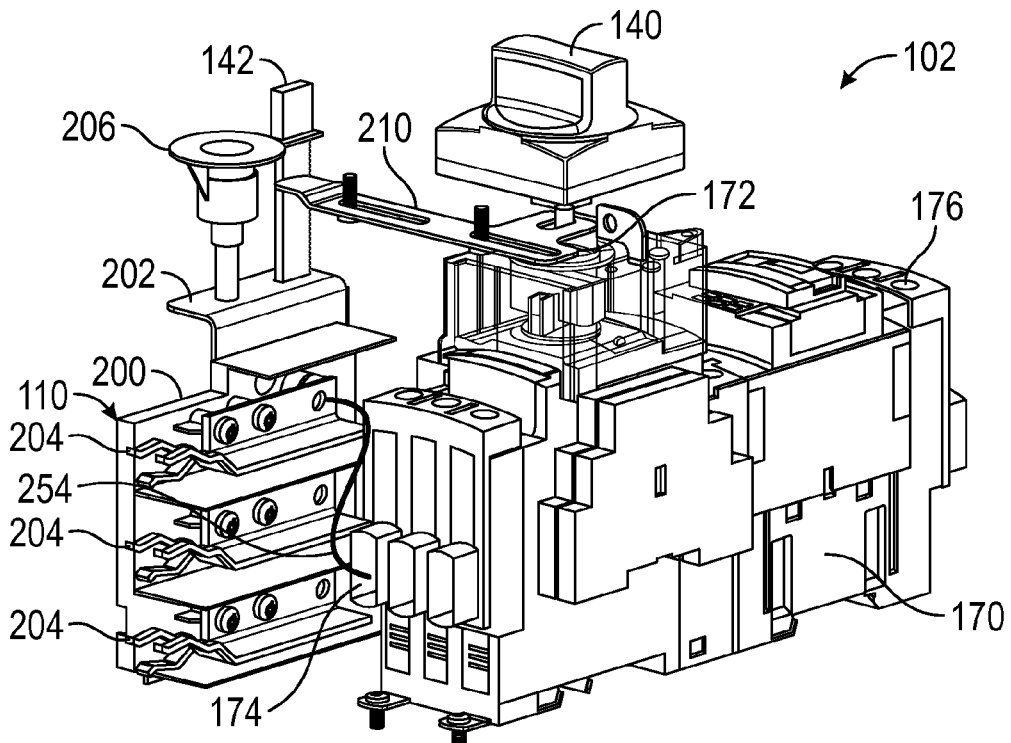
FIG. 4B is a perspective view of the interior components of the mountable electrical control device with the example retractable connector assembly.

FIG. 3 is a side view of the switch unit 102 in relation to the power bus bar assembly 106 on the pan 104 when the retractable connector assembly 110 is extended. In FIG. 3, the casing 120 in FIG. 1 has been removed to show the internal components of the switch unit 102. An internal housing 170 holds electrical components such as circuit breakers, switches, controllers and relays and associated mechanical controls for the switch unit 102. A shaft 172 extends from the internal housing 170 and is attached to the rotational knob 140. Turning the shaft 172 via the rotational knob 140 to the ON position activates the power to the switch unit 102. Internal electrical connectors 174 as shown in FIGS. 4A-4B are coupled to flexible conductor cables 254 for connection to the electrical retractable connector assembly 110. The flexible conductor cables 254 may be high stranded insulated wire or other suitable cables. Similarly internal electrical connectors 176 are provided which provide power to the power sockets 128 in FIG. 2.

As shown in FIGS. 3-6, the retractable connector assembly 110 includes a retractable sled 200 mounted on a vertically oriented frame plate 202. The retractable sled 200 is moveable between a retracted position and an extended position (shown in FIG. 3) relative to the frame plate 202 which is fixed to the switch unit 102. The sled 200 includes three electrical connector assemblies 204 which engage the conductor bus bars 156 of the bus bar assembly 106 when the sled 200 is in the extended position as shown in FIG. 3. Of course any number of electrical connectors may be mounted on the sled 200. As will be explained below, a user may move the sled 200 between the extended and retracted position by rotating an operator handle mechanism 206 that includes the socket 144. An electrical connection with the power bus bar assembly 106 is created when the sled 200 is in the extended position. When the sled 200 is in the retracted position, it electrically disconnects the switch unit 102 from the power bus bar assembly 106. The sled 200 may be locked into place via the lock plate mechanism 142 when the sled 200 is in the extended position. An interlock slide bar 210 is controlled by the rotational knob 140 to prevent the rotation of the operator handle mechanism 206 when the rotational knob 140 is in the ON position.

Figure 5A:
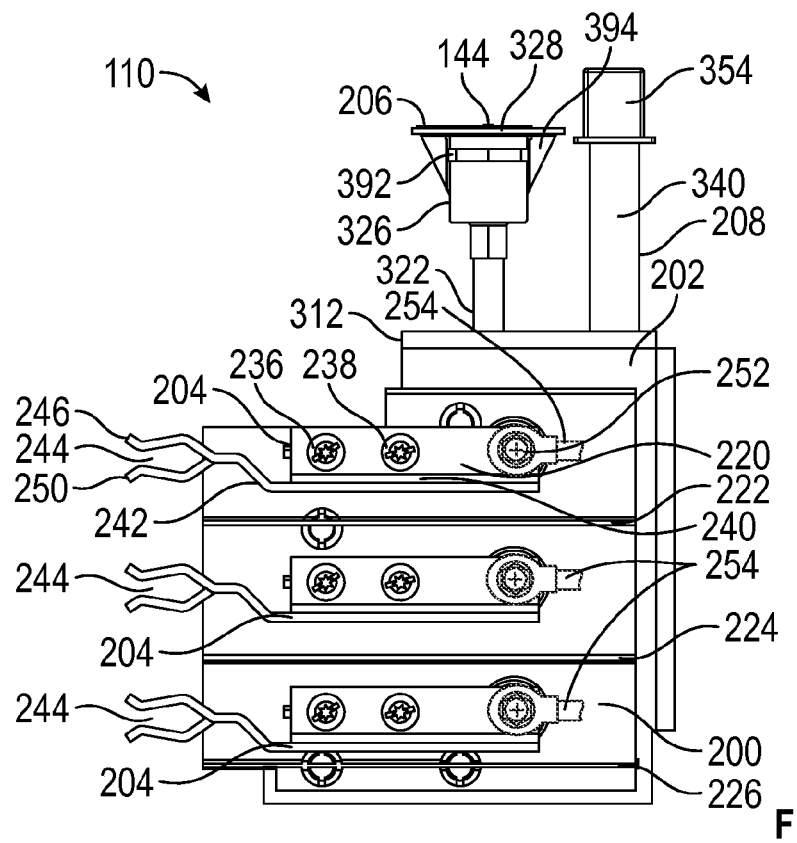
FIG. 5A is a side view of the example connector assembly of FIG. 3.
Figure 5B:
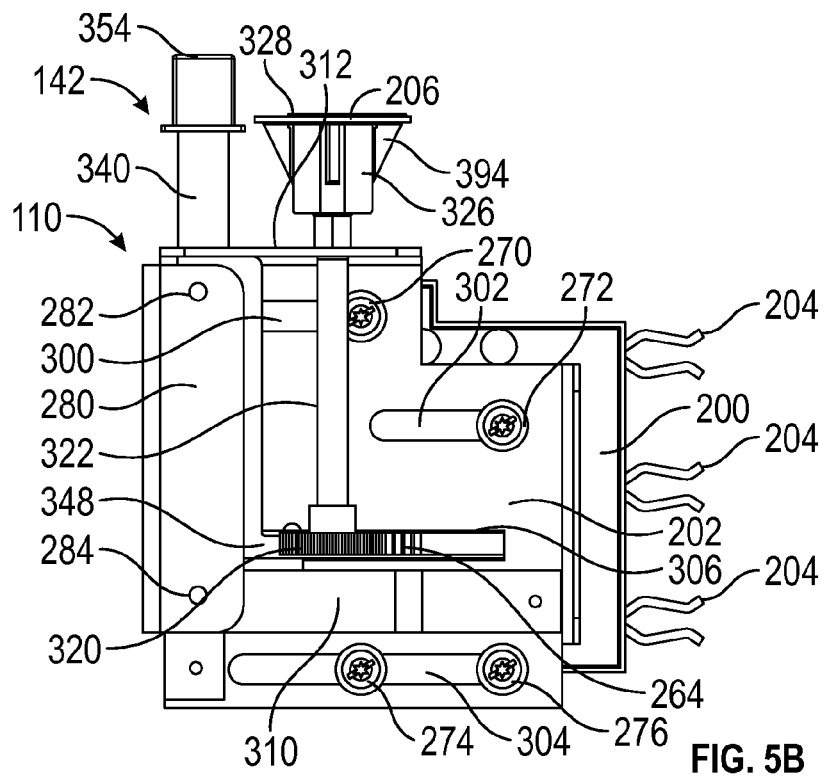
FIG. 5B is a side view of the opposite side of the example connector assembly shown in FIG. 5A.

FIG. 4A is a perspective view of the internal components of the switch unit 102 with the casing 120 shown in FIGS. 1-2 partially removed to show the location of the retractable connector assembly 110 relative to the interior housing 170. FIG. 4B is a perspective view of the internal components of the switch unit 102 including the retractable connector assembly 110, the interior housing 170 and the rotational knob 140 with the casing 120 entirely removed. FIGS. 5A and 5B are detailed side views of the retractable connector assembly 110 and FIG. 6 is an isolated perspective close up view of the retractable connector assembly 110.

Figure 6:
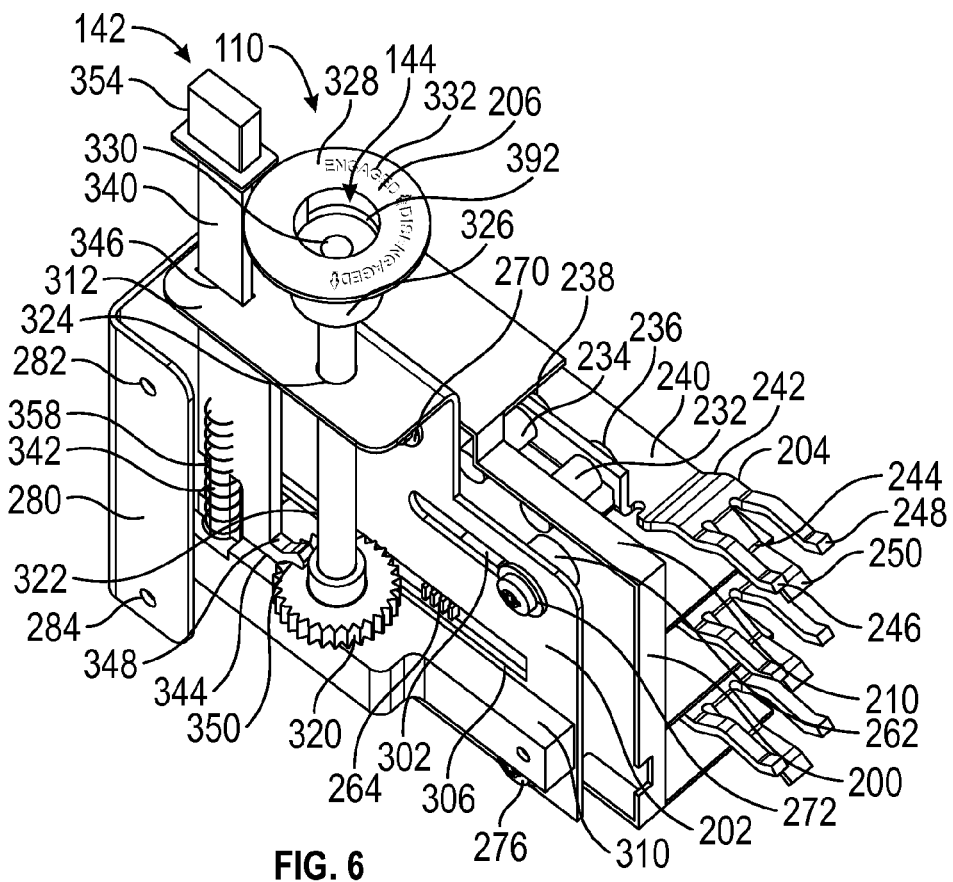
FIG. 6 is a perspective view of the example connector assembly of FIG. 3.

As shown in detail in FIGS. 4-6, the sled 200 includes a vertical support plate 220 that has a first side joined to three horizontal plates 222, 224, and 226, which each extend perpendicularly from the support plate 220. The vertical support plate 220 also holds the three electrical jaw conductor assemblies 204 each of which are mounted immediately above one of the horizontal plates 222, 224 and 226. Each of the electrical jaw conductor assemblies 204 includes a support member 230 having two cylindrical supports 232 and 234. The cylindrical supports 232 and 234 allow attachment of the support member 230 to the first side of the vertical support plate 220 via screws 236 and 238. The cylindrical supports 232 and 234 allow the support member 230 to be suspended from the side of the vertical support plate 220. A conductor bar 240 is attached perpendicularly to the support member 230. The conductor bar 240 includes an angled extension arm 242 which ends in a jaw stab connector electrical contact 244 that extends from the retractable sled 200. As shown in FIG. 2, the jaw stab connector contacts 244 of the electrical connector assemblies 204 are aligned with slots 127 cut into the insulated vanes 126. The components of the sled 200 including the support plate 220 and horizontal plates 222, 224 and 226 are made of an electrically insulating material and are dimensioned to provide the necessary electrical clearances between each of the jaw stab connector contacts 244 and grounded metal of the switch device 102.

As shown in greater detail in FIG. 6, the jaw stab connector electrical contact 244 includes two upper arms 246 and 248 and a lower arm 250 that engage one of the bus bars 156 of the power bus bar assembly 106 in FIG. 2 when the sled 200 is extended from the retractable connector assembly 110. As shown in FIG. 5A, each of the conductor bars 240 also includes a ring tongue connection point 252 which is used to connect flexible conductor cables 254 from the connector assembly 204 to the internal electrical connectors 174 mounted on the internal housing 170. This flexibility of the electrical connection between the connector assemblies 204 and the switch unit 102 is made using the flexible cables 254. The flexible conductor cables 254 have a length sufficient to allow the sled 200 to move between the extended position and the retracted position while maintaining connection with the internal connectors 174. It is to be understood that different connector types may be used instead of the shape of jaw stab connector contacts 244.

As shown in FIG. 5B and FIG. 6, the vertical support plate 220 of the sled 200 has an opposite side mounting two upper support pins 260 and 262 and a rack 264 which extends along the bottom of the interlock slide bar 210. The two upper support pins 260 and 262 slide in two upper horizontal slots 300 and 302 which are cut into the frame plate 202. The two upper support pins 260 and 262 are held into the respective slots 300 and 302 via bolts 270 and 272. Two lower support pins (not shown) slide in a lower slot 304. The lower support pins are held into the lower slot 304 by bolts 274 and 276. The frame plate 202 includes a bracket 280. The bracket 280 includes two holes 282 and 284 to which bolts 286 and 288 are inserted to hold the bracket 280 to the wall of the casing 120 as shown in FIGS. 2 and 3.

A base support structure 310 is attached to the bottom of the frame plate 202. A top guide plate 312 extends perpendicularly from the frame plate 202 over the base support structure 310. The rack 264 is sized to slide in an elongated horizontal slot 306 near the bottom of the frame plate 202. The rack 264 includes teeth that engage the respective teeth of a spur gear 320. The spur gear 320 is coupled to the base support structure 310 of the frame plate 202 and is fixed to one end of a shaft 322 that is mounted through an opening 324 on the guide plate 312 that forms the operator handle mechanism 206. The other end of the shaft 322 is joined to a cylindrical body 326 which has a circular top surface 328 with an interior male hex pin 330 that allows a user to rotate the shaft 322 via engaging the hex pin 330 with a tool such as a wrench. The wrench engages the hex pin 330 to rotate the spur gear 320 with the shaft 322 thereby engaging the rack 264 to move the sled 200 between the extended and retracted position. The assembly of the spur gear 320 and shaft 322 reduces the cranking operations of the tool required by a user to less than a full turn to extend or retract the sled 200. In this example, 90 degrees of rotation (a quarter turn) of the shaft 322 is required to move the sled 200 between the extended and retracted position while still providing for a compact retractable mechanism. The top surface 328 serves as an indicator plate and includes indicia 332 which show whether the sled 200 is retracted (disengaged) or extended (engaged) for reference for a user turning the cylindrical body 326. In this example, the indicia 332 includes two arrows at approximately 90 radial degrees from each other on the top surface 328 and text indicating engagement or disengagement when the respective arrow is aligned showing the rotational position of the shaft 322 and spur gear 320.

Figure 7A:
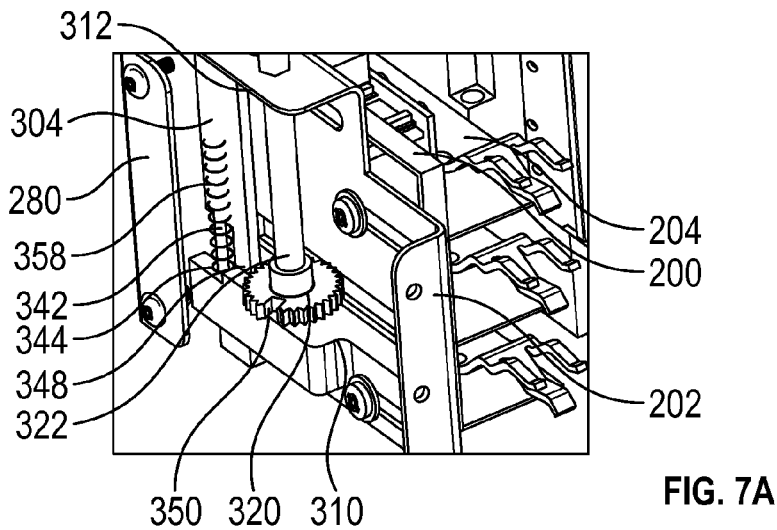
FIG. 7A is an isolated close up perspective view of the locking mechanism in a disengaged position in relation to a spur gear in the connector assembly in FIG. 6.
Figure 7B:
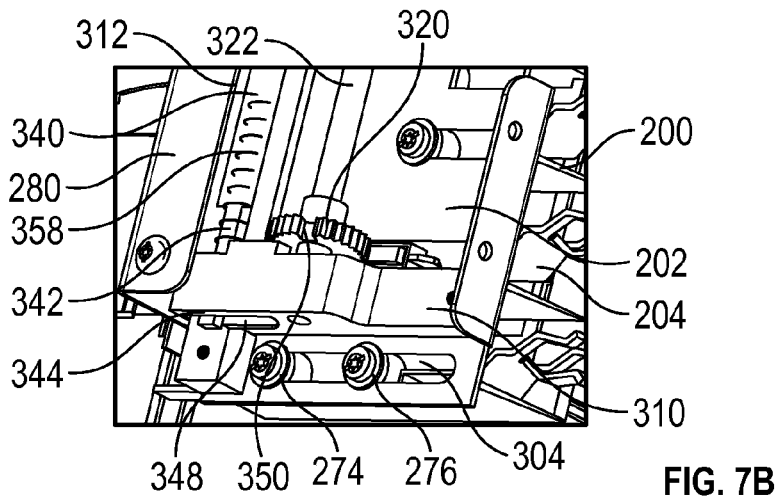
FIG. 7B is another isolated close up perspective view of the locking mechanism in the disengaged position in relation to the spur gear in the connector assembly in FIG. 6.
Figure 7C:
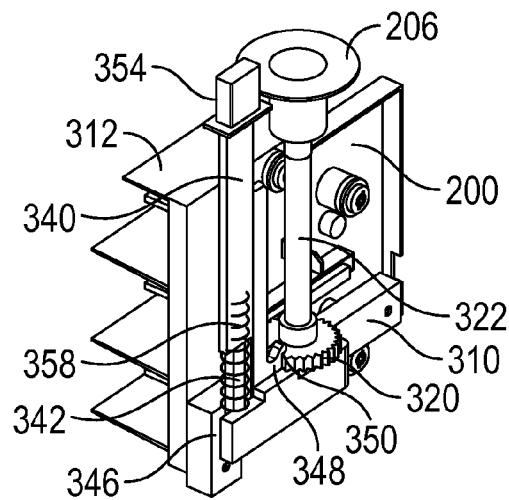
FIG. 7C is a close up perspective view of the locking mechanism in the connector assembly in FIG. 6 in an engaged position locking the spur gear.

The retractable connector assembly 110 also includes a plunger 340 which is part of the lock plate mechanism 142 to lock the spur gear 320 and hence the position of the sled 200. The plunger 340 slides in a vertical direction relative to the frame plate 202. FIGS. 7A-7C are close up perspective views of the interaction of the plunger 340 with the spur gear 320. FIGS. 7A and 7B are perspective views of the plunger 340 when the sled 200 is in the retracted position. FIG. 7C is a perspective view of the plunger 340 when the sled 200 is in the extended position. As shown in detail in FIGS. 6 and 7A-7C, a support bar 342 on one end of the plunger 340 is seated in a groove 344 cut into the base support structure 310. The plunger 340 extends through a slot 346 in the top guide plate 312. A tab 348 attached to the bottom end of the plunger 340 is also seated in the groove 344. The tab 348 has a width that is smaller than a slot 350 cut into the body of the spur gear 320. The plunger 340 includes an end with a release button 354. The support bar 342 is inserted through a biasing spring 358 that is compressed between the base support structure 310 and the body of the plunger 340. In this manner the plunger 340 is forced by the spring 358 to move the tab 348 against the bottom of the spur gear 320 as shown in FIGS. 7A-7B. When the spur gear 320 causes the sled 200 to move from the retracted position to the extended position, the lock plate mechanism 142 is disengaged as the tab 348 is prevented from moving up by the bottom surface of the spur gear 320. Thus, the spur gear 320 is allowed to rotate since the lock plate mechanism 142 does not interfere with the rotation of the spur gear 320. When the sled 200 reaches the extended position as shown in FIGS. 6 and 7C, the lock plate mechanism 142 is engaged by the tab 348 being forced into the slot 350 of the spur gear 320 thereby preventing further rotation of the spur gear 320. The spur gear 320 cannot rotate and prevents the sled 200 from moving. When a user disengages the lock plate mechanism 142 by depressing the plunger 340 by pressing the release button 354, the tab 348 is moved down into the groove 344, below the slot 350, compressing the spring 358. The tab 348 thus is removed from the slot 350 of the spur gear 320 which allows the sled 200 to be moved from the extended position by rotating the spur gear 320 via the handle mechanism 206.

FIGS. 4A, 4B, 8A and 8D show a further interlock assembly for the electrical retractable connector assembly 110. The interlock slide bar 210 is coupled between the retractable connector assembly 110 and the rotational knob 140 on the switch unit 102. The interlock slide bar 210 has two slots 370 and 372 that engage in pins 374 and 376 extending from the body of the casing 120 of the electrical switch unit 102. The interlock slide bar 210 includes an extension bar 380 which includes a slot 382. The rotational knob 140 is mounted on the shaft 172 which translates the rotational motion of the knob 140 to internal connectors to turn on the switch unit 102. The shaft 172 is attached to a pivoting arm 384 that includes a pin 386 that engages the slot 382 to move the interlock slide bar 210 when the rotational knob 140 is rotated. An opposite end of the interlock slide bar 210 has a blocking blade 390 which may be inserted into the cylindrical body 326. When the knob 140 is rotated to an ON position, the arm 384 rotates and the pin 386 moves in the slot 382 to cause the interlock slide bar 210 to move along the slots 370 and 372 guided by the fixed pins 374 and 376 respectively. The blocking blade 390 of the interlock bar 210 is inserted through a slot 392 in the cylindrical body 326 which is aligned with the interlock bar 210 when the sled 200 is in the extended position. The alignment of the slot 392 of the cylindrical body 326 allows the interlock slide bar 210 to block the hex socket 144 thereby blocking the engagement of a tool with the hex pin 330, preventing the attached shaft 322 from being rotated when the rotational knob 140 is on and the sled 200 is in the extended position.

The cylindrical body 326 includes external vanes 394 which border the slot 392. When the sled 200 is in the retracted position, the vanes 394 prevent the interlock slide bar 210 from moving and therefore prevent the rotational knob 140 from being turned to the ON position providing an additional safety measure to prevent the switch unit 102 from being turned on if the sled 200 is in a retraced position to prevent arcing from the power bus bar assembly 106.

Figure 8A:
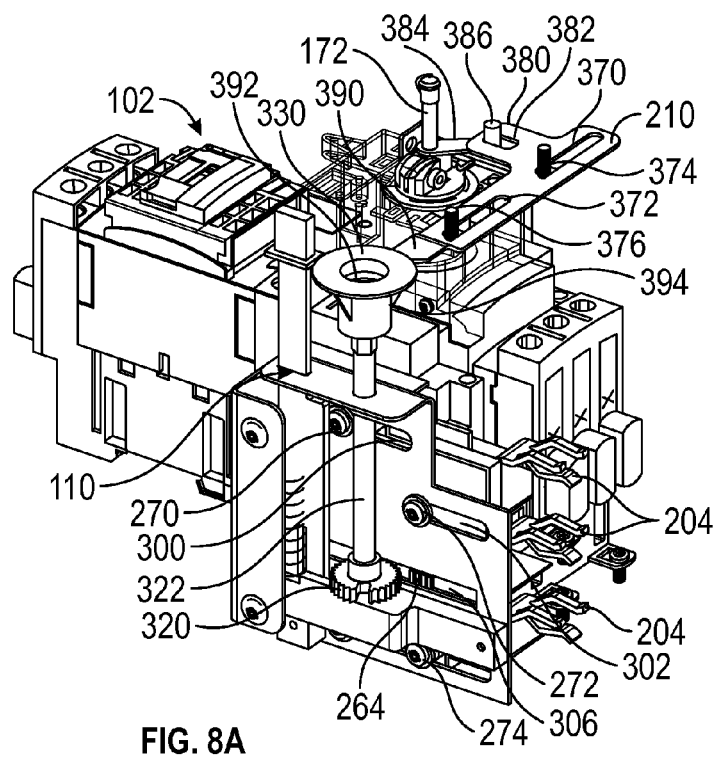
FIG. 8A is a perspective view of the electrical device in FIG. 1 with the electrical connectors of the connector assembly in a retracted position.
Figure 8B:
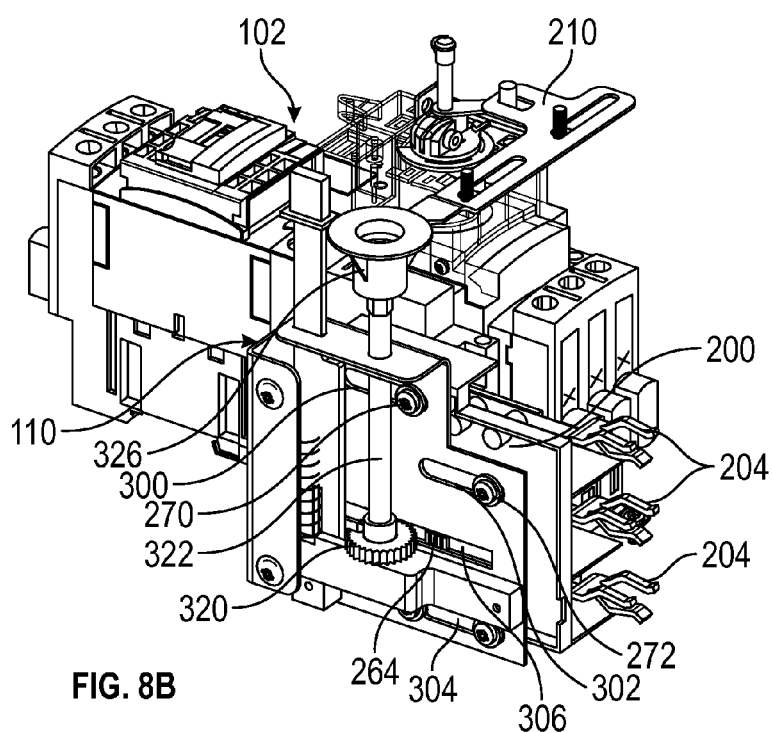
FIG. 8B is a perspective view of the electrical device in FIG. 1 with the electrical connectors of the connector assembly in an extended position engaging the power bus bar assembly in FIG. 1.

As may be shown in FIGS. 8A and 8B, the retractable connector assembly 110 allows a user to engage the connector assemblies 204 with the conductor bus bars 156 on the power bus bar assembly 106. In this example, the sled 200 is designed to translate a sufficient distance to disengage the connector assemblies 204 from the I-Line power bus bar assembly 106 and provide sufficient through air clearance when the sled 200 is in the retracted position as shown in FIG. 8A. The flexibility of the electrical connection is obtained thru the use of highly flexible wire between the connection points 252 of the conductor assemblies 204 on the sled 200 and the internal electrical connectors 174 of the motor control switch unit 102 shown as an example in FIG. 2.

As shown in FIG. 8B, the sled 200 is moved to the extended position by the rack 264 interacting with the spur gear 320. A user engages the hex pin 330 in the socket 144 with a tool such as a wrench. Turning the tool rotates the cylindrical body 326 which turns the shaft 322 which turns the attached spur gear 320. The teeth of the spur gear 320 mesh with the teeth of the rack 264 which move the sled 200 to extend the jaw stab connectors 244. In this example, the user only needs to turn the cylindrical body 326 a quarter turn in order to extend the sled 200 to engage the jaw stab connector contacts 244 with the power bus bar assembly 106. The user is provided with the indicators 332 as to the position of the sled 200 on the top surface 328 of the cylindrical body 326. In this manner, when the switch unit 102 is installed on the pan 104, the user must extend the retractable connector assembly 110 in order to connect the switch unit 102 to the power bus bar assembly 106 preventing inadvertent electrical hazards from direct electrical connection of the switch unit 102.

Figure 8C:
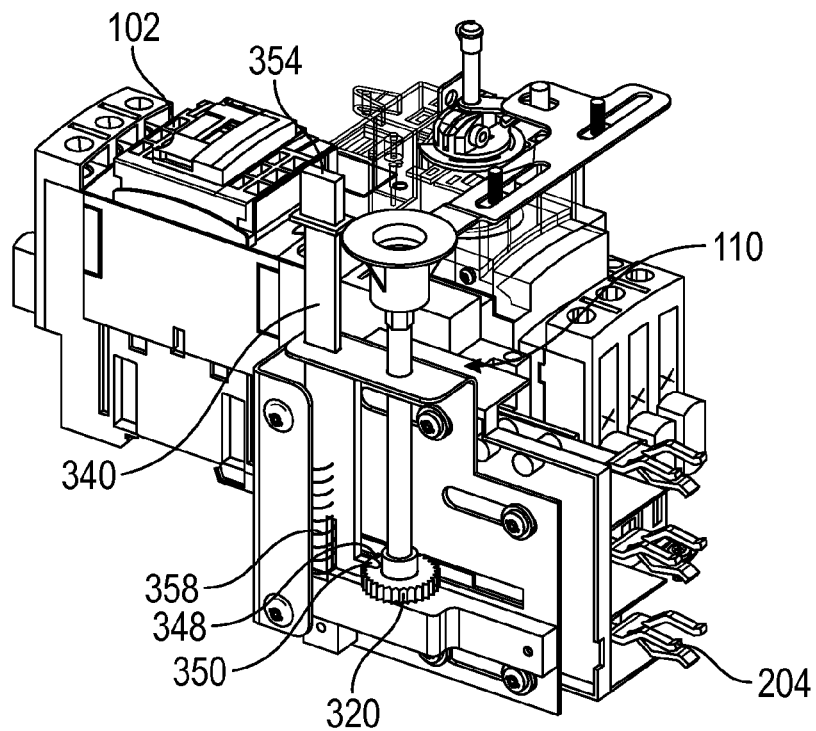
FIG. 8C is a perspective view of the electrical device in FIG. 1 with the electrical connectors of the connector assembly in an extended position with the locking mechanism engaged.

As shown in FIG. 8C, when the jaw stab connector contacts 244 are fully engaged onto the conductor bus bars 156 of the bus bar stack 154 of the power bus bar assembly 106, the tab 348 of the spring loaded plunger 340 prevents the spur gear 320 from rotating until the user depresses the release button 354 on the plunger 340. This prevents the jaw stab connector contacts 244 from becoming disengaged from the conductor bars 156 of the power bus bar assembly 106 during normal operation or during a short circuit event. The tab 348 is forced by the spring 358 to fill the slot 350 in the spur gear 320. The spur gear 320 cannot rotate and therefore prevents the sled 200 from being moved from the extended position in FIG. 8C.

Figure 8D:
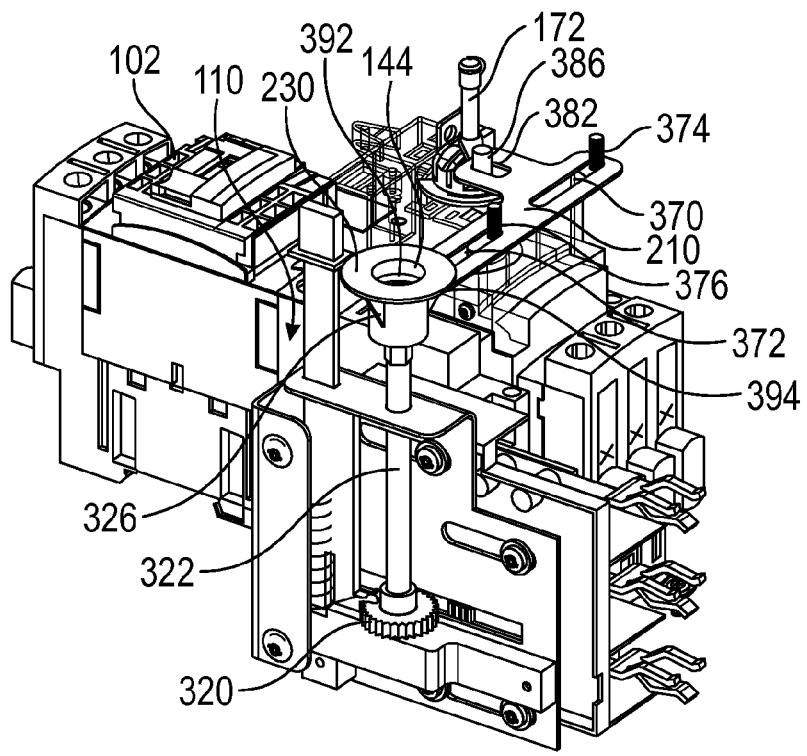
FIG. 8D is a perspective view of the electrical device in FIG. 1 with the connectors of the connector assembly in an extended position with a blocking blade connected to a power dial knob on the electrical control device engaged to prevent access to a hex socket.

FIG. 8D shows the operation of the switch device 102 using the interlock bar 210 to avoid the potential unsafe practice of turning on the switch device 102 and retracting the sled 200. As shown in FIG. 8D, access to the hex socket 144 is blocked by the bar 210 activated by the position of the rotational knob 140. Turning the rotational knob 140 moves the shaft 172 and the attached arm 384. The pin 386 moves the bar 210 to be guided by the pins 374 and 376 in slots 370 and 372 to move the blocking blade 390 of the bar 210 into the slot 392 of the cylindrical body 326. Thus, when the rotational knob 140 is in the ON position, a user cannot move the sled 200 as the socket 144 is blocked by the bar 210.

While the present invention has been described with reference to one or more particular embodiments, those skilled in the art will recognize that many changes can be made thereto without departing from the spirit and scope of the present invention. Each of these embodiments and obvious variations thereof is contemplated as falling within the spirit and scope of the claimed invention, which is set forth in the following claims.

What is claimed is:

1. A retractable connector assembly for establishing an electrical connection between a power bus bar and an electrical device, the retractable connector assembly comprising:
   a frame plate;
   a sled having a rack and an electrical connector assembly having an electrical contact, the sled having an extended position and a retracted position relative to the frame plate; and
   a spur gear coupled to the frame plate, the spur gear engaging the rack to move the sled between the retracted position and the extended position when the spur gear is rotated, wherein when the sled is in the extended position the electrical contact creates an electrical connection with the power bus bar and when the sled is in the retracted position, the electrical contact is electrically disconnected from the power bus bar.

2. The retractable connector assembly of claim 1, wherein the spur gear moves the sled between the extended and retracted position in less than one full rotation of the shaft.

3. The retractable connector assembly of claim 1, wherein the sled includes a pin and the frame plate includes a slot engaging the pin, allowing the pin to move in the slot when the sled moves between the extended and retracted position.

4. The retractable connector assembly of claim 1, wherein the electrical device is mounted in fixed position relative to the power bus bar on a pan.

5. The retractable connector assembly of claim 1, wherein the electrical contact is a jaw type connector.

6. The retractable connector assembly of claim 1, wherein the connector assembly of the sled includes a flexible conductor cable connected to the electrical device and having a length sufficient to allow the sled to move between the extended position and the retracted position.

7. The retractable connector assembly of claim 1, further comprising: a lock plate having an engaged position and a disengaged position, wherein the spur gear includes a slot and wherein the lock plate mates with the slot preventing the rotation of the spur gear when the lock plate is in an engaged position.

8. The retractable connector assembly of claim 7, wherein the lock plate is in contact with a compressible spring to bias the lock plate in the engaged position.

9. The retractable connector assembly of claim 1, further comprising a shaft having one end connected to the spur gear and a second opposite end having a cylindrical body with a socket, the shaft providing rotational force to the spur gear.

10. The retractable connector assembly of claim 9, wherein the socket is engageable with a tool to rotate the shaft.

11. The retractable connector assembly of claim 9, wherein the electrical device includes a rotatable knob to activate the electrical device, the connector assembly further comprising:
    a blocking blade engaged with the knob, wherein when the knob is rotated in an activation position, the blocking blade blocks access to the socket of the cylindrical body through a slot formed in the cylindrical body.

12. The retractable connector assembly of claim 9, wherein the shaft passes through an opening in the frame plate.

13. An electrical device for mounting on a pan in fixed position relative to a power bus assembly, comprising:
    a chassis for connection with the pan;
    an electrical component having an electrical input, the electrical component attached to the chassis; and a retractable connector assembly electrically coupled to the electrical input, the retractable connector assembly including:
  a frame plate fixed to the chassis;
  a sled having a rack and an electrical connector assembly having an electrical contact, the sled having an extended position and a retracted position relative to the frame plate; and
  a spur gear coupled to the frame plate, the spur gear engaging the rack to move the sled between the retracted position and the extended position when the spur gear is rotated, wherein when the sled is in the extended position the electrical contact creates an electrical connection with the power bus bar and when the sled is in the retracted position, the electrical contact is electrically disconnected from the power bus bar.

14. The electrical device of claim 13, wherein the spur gear moves the sled between the extended and retracted position in less than one full rotation of the shaft.

15. The electrical of claim 13, further comprising: a lock plate in contact with a compressible spring, wherein the spur gear includes a slot, the lock plate having an engaged position and a disengaged position, wherein the lock plate is biased by the spring in the engaged position to mate with the slot preventing the rotation of the spur gear.

16. The electrical device of claim 13, further comprising a flexible conductor cable connected between the electrical connector assembly and the electrical input and having a length sufficient to allow the sled to move between the extended position and the retracted position.

17. The electrical device of claim 13, wherein the electrical component is one of a motor starter or a circuit breaker.

18. The electrical device of claim 13, wherein the connector assembly includes a shaft having one end connected to the spur gear and a second opposite end having a cylindrical body with a socket engageable with a tool, the shaft providing rotational force to the spur gear when turned by the tool.

19. The electrical device of claim 18, further comprising a rotatable knob to activate the electrical device; and
  a blocking blade engaged with the knob, wherein when the knob is rotated in an activation position, the blocking blade blocks access to the socket of cylindrical body through a slot formed in the cylindrical body.

20. A panel board switching assembly comprising:
  a pan;
  a bus bar assembly having a bar conductor and insulators mounted on the pan;
  an electrical switch unit mounted in proximity to the bus bar assembly, the electrical switch unit including:
  a chassis for connection with the pan;
  an electrical component having an electrical input, the electrical component attached to the chassis; and
  a retractable connector assembly electrically coupled to the electrical input, the retractable connector assembly including:
    a frame plate fixed to the chassis;
    a sled having a rack and an electrical connector assembly having an electrical contact, the sled having an extended position and a retracted position relative to the frame plate; and
    a spur gear coupled to the frame plate, the spur gear engaging the rack to move the sled between the retracted position and the extended position when the spur gear is rotated, wherein when the sled is in the extended position the electrical contact creates an electrical connection with the power bus bar and when the sled is in the retracted position, the electrical contact is electrically disconnected from the power bus bar.

* * * * *